US012737984B2

(12) United States Patent
Zhang et al.

(10) Patent No.: US 12,737,984 B2
(45) Date of Patent: Sep. 15, 2026

(54) CREATING THREE-DIMENSIONAL (3D) AVATARS

(71) Applicants: Beijing Zitiao Network Technology Co., Ltd., Beijing (CN); Lemon Inc., Grand Cayman (KY)

(72) Inventors: Jianfeng Zhang, Singapore (SG); Huichao Zhang, Beijing (CN); Jun Hao Liew, Singapore (SG); Chenxu Zhang, Los Angeles, CA (US); Jiashi Feng, Singapore (SG)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 149 days.

(21) Appl. No.: 18/902,805

(22) Filed: Sep. 30, 2024

(65) Prior Publication Data

US 2026/0094370 A1 Apr. 2, 2026

(51) Int. Cl.

| | |
|---|---|
| ***G06T 17/20*** | (2006.01) |
| ***G06T 13/40*** | (2011.01) |
| ***G06T 15/20*** | (2011.01) |
| ***G06T 19/20*** | (2011.01) |

(52) U.S. Cl.
CPC .............. *G06T 17/20* (2013.01); *G06T 13/40* (2013.01); *G06T 15/20* (2013.01); *G06T 19/20* (2013.01); *G06T 2219/2021* (2013.01)

(58) Field of Classification Search
CPC ......... G06T 17/20; G06T 13/40; G06T 15/20; G06T 19/20; G06T 2219/2021
See application file for complete search history.

(56) References Cited

U.S. PATENT DOCUMENTS

| | | | | |
|---|---|---|---|---|
| 2018/0315230 | A1* | 11/2018 | Black | G06T 19/20 |
| 2021/0134042 | A1* | 5/2021 | Streuber | G06F 16/00 |
| 2023/0181124 | A1* | 6/2023 | Mcduff | G06N 20/00 |
| 2023/0267671 | A1* | 8/2023 | Kim | G06T 7/70 345/473 |

OTHER PUBLICATIONS

Kitamura, Takumi, "A Two-Step Approach for Interactive Animatable Avatars", Dec. 2023, Springer, pp. 491-509 (Year: 2023).*

Weng, Zhenzhen, "ZeroAvatar: Zero-shot 3D Avatar Generation from a Single Image", May 2023, Arxiv, pp. 1-14 (Year: 2023).*

(Continued)

*Primary Examiner* — Terrell M Robinson

(74) *Attorney, Agent, or Firm* — BakerHostetler

(57) ABSTRACT

Techniques for creating high-quality and animatable three-dimensional (3D) avatars are provided. A 3D human representation with a pre-defined pose is generated in a canonical space by adopting a coarse-to-fine pipeline. The 3D human representation corresponds to a 3D avatar to be created based on input text. The 3D human representation is deformed to a target pose defined by a Skinned Multi-Person Linear (SMPL) parameter in a deformed space. The 3D avatar is created by implementing iterative optimization of the 3D human representation in the canonical space and the deformed space by applying a Score Distillation Sampling (SDS) loss based on the input text and information indicative of poses.

20 Claims, 14 Drawing Sheets

300

(56) References Cited

OTHER PUBLICATIONS

Zeng, Yifei, "AvatarBooth: High-Quality and Customizable 3D Human Avatar Generation", Jun. 2023, Arxiv, pp. 1-11 (Year: 2023).*
MetaHuman / Digital Humans; https://www.metahuman.com/en-US; MetaHuma; accessed Sep. 10, 2025; 5 pages.
Clip Score Module Interface; https://lightning.al/docs/torchmetrics/stable/multimodal/clip score.html; Lightning; accessed Sep. 10, 2025; 6 pages.
Alldieck et al.; "imGHUM: Implicit Generative Models of 3D Human Shape and Articulated Pose"; IEEE/CVF Int'l Conf. on Computer Vision; 2021; p. 5461-5470.
Cao et al.; "DreamAvatar: Text-and-Shape Guided 3D Human Avatar Generation via Diffusion Models"; CVPR; arXiv:2304.00916; Nov. 2023; 11 pages.
Desbrun et al.; "Implicit Fairing of Irregular Meshes using Diffusion and Curvature Flow"; SIGGRAPH; 1999; p. 317-324.
Detlefsen et al.; "TorchMetrics—Measuring Reproducibility in PyTorch"; The Journal of Open Source Software; vol. 7(70); 2022; 4 pages.
Guler et al.; "DensePose: Dense Human Pose Estimation in the Wild"; IEEE Conf. on Computer Vision and Pattern Recognition; 2018; p. 7297-7306.
Threestudio: a unified framework for 3D content generation; https://github.com/threestudio-project/threestudio; GitHub; accessed Sep. 10, 2025; 21 pages.
Hong et al.; "EVA3D: Compositional 3D Human Generation from 2D Image Collections"; CVPR; arXiv:2210.04888; Oct. 2022; 21 pages.
Hong et al.; "AvatarCLIP: Zero-Shot Text-Driven Generation and Animation of 3D Avatars"; ACM Transactions on Graphics; vol. 41; 2022; 19 pages (Abstract Only).
Huang et al.; "DreamWaltz: Make a Scene with Complex 3D Animatable Avatars"; CVPR; arXiv:2305.12529; Nov. 2023; 19 pages.
Jain et al.; "Zero-Shot Text-Guided Object Generation With Dream Fields"; IEEE/CVF Conf. on Computer Vision and Pattern Recognition; 2022; p. 867-876.
Jiang et al.; "AvatarCraft: Transforming Text into Neural Human Avatars with Parameterized Shape and Pose Control"; CVPR; arXiv:2303.17606; Aug. 2023; 16 pages.
Kerbel et al.; "3D Gaussian Splatting for Real-Time Radiance Field Rendering"; Graphics; arXiv:2308.04079; Aug. 2023; 14 pages.
Khalid et al.; "CLIP-Mesh: Generating textured meshes from text using pretrained image-text models"; CVPR; arXiv:2203.13333; Sep. 2022; 8 pages.
Kingma et al.; "Adam: A Method for Stochastic Optimization"; ICLR; arXiv:1412.6980; Jan. 2017; 15 pages.
Kocabas et al.; "PARE: Part Attention Regressor for 3D Human Body Estimation"; ICCV; 2021; p. 11127-11137.
Kolotouros et al.; "DreamHuman: Animatable 3D Avatars from Text"; 37th Conference on Neural Information Processing Systems; 2023; 14 pages.
Laine et al.; "Modular primitives for high-performance differentiable rendering"; ACM Transactions on Graphics; vol. 39 Issue 6; arXiv:2011.03277; Nov. 2020; 14 pages.
Li et al.; "HybrIK: A Hybrid Analytical-Neural Inverse Kinematics Solution for 3D Human Pose and Shape Estimation"; IEEE/CVF Conf. on Computer Vision and Pattern Recognition; 2021; p. 3383-3393.
Liao et al.; "TADA! Text to Animatable Digital Avatars"; arXiv:2308.10899; Aug. 2023; 18 pages.
Lin et al.; "Magic3D: High-Resolution Text-to-3D Content Creation"; IEEE/CVF Conf. on Computer Vision and Pattern Recognition; 2023; p. 300-309.
Lin et al.; "Common Diffusion Noise Schedules and Sample Steps Are Flawed"; CVPR; arXiv:2305.08891; Jan. 2024; 8 pages.
Loper et al.; "SMPL: A Skinned Multi-Person Linear Model"; Seminal Graphics Papers: Pushing the Boundaries; vol. 2 Article No. 88; Aug. 2023; p. 851-866 (Abstract Only).
Lorensen et al.; "Marching cubes: a high resolution 3D surface construction algorithm"; Seminal Graphics: Pioneering Efforts that Shaped the Field; Jul. 1998; p. 347-353.
Metzer et al.; "Latent-NeRF for Shape-Guided Generation of 3D Shapes and Textures"; CVPR; arXiv:2211.07600; Nov. 2022; 11 pages.
Mildenhall et al.; "NeRF: representing scenes as neural radiance fields for view synthesis"; Communications of the ACM; vol. 65 No. 1; Jan. 2022; p. 99-106.
Muller et al.; "Instant neural graphics primitives with a multiresolution hash encoding"; ACM Transactions on Graphics; vol. 41 No. 4; 2022; 15 pages.
Nealen et al.; "Laplacian mesh optimization"; 4th Int'l Conf. on Computer Graphics and Interactive Techniques in Australasia and Southeast Asia; 2006; p. 381-389.
Pavlakos et al.; "Expressive Body Capture: 3D Hands, Face, and Body From a Single Image"; IEEE/CVF Conf. on Computer Vision and Pattern Recognition; 2019; p. 10975-10985.
Poole et al.; "DreamFusion: Text-to-3D using 2D Diffusion"; CVPR; arXiv:2209.14988; Sep. 2022; 18 pages.
Radford et al.; "Learning Transferable Visual Models From Natural Language Supervision"; 38th Int'l Conf. on Machine Learning; vol. 139; 2021; p. 8748-8763.
Richardson et al.; "TEXTure: Text-Guided Texturing of 3D Shapes"; CVPR; arXiv:2302.01721; Feb. 2023; 13 pages.
Rombach et al.; "High-Resolution Image Synthesis With Latent Diffusion Models"; IEEE/CVF Conf. on Computer Vision and Pattern Recognition; 2022; p. 10684-10695.
Saharia et al.; "Photorealistic Text-to-Image Diffusion Models with Deep Language Understanding"; CVPR; arXiv:2205.11487; May 2022; 46 pages.
Sanghi et al.; "CLIP-Forge: Towards Zero-Shot Text-To-Shape Generation"; IEEE/CVF Conf. on Computer Vision and Pattern Recognition; 2022; p. 18603-18613.
Schuhmann et al.; "LAION-5B: An open large-scale dataset for training next generation image-text models"; 36th Conference on Neural Information Processing Systems; 2022; 17 pages.
Schwarz et al.; "VoxGRAF: Fast 3D-Aware Image Synthesis with Sparse Voxel Grids"; 36th Conference on Neural Information Processing Systems; 2022; 13 pages.
Shen et al.; "Deep Marching Tetrahedra: a Hybrid Representation for High-Resolution 3D Shape Synthesis"; 35th Conference on Neural Information Processing Systems; 2021; 15 pages.
Shi et al.; "MVDream: Multi-view Diffusion for 3D Generation"; CVPR; arXiv:2308.16512; Apr. 2024; 21 pages.
Tevet et al.; "Human Motion Diffusion Model"; CVPR; arXiv:2209.14916; Oct. 2022; 12 pages.
Wang et al.; "ProlificDreamer: High-Fidelity and Diverse Text-to-3D Generation with Variational Score Distillation"; 37th Conference on Neural Information Processing Systems; 2023; 36 pages.
Xu et al.; "XAGen: 3D Expressive Human Avatars Generation"; 37th Conference on Neural Information Processing Systems; 2023; 14 pages.
Ye et al.; "IP-Adapter: Text Compatible Image Prompt Adapter for Text-to-Image Diffusion Models"; CVPR; arXiv:2308.06721; Aug. 2023; 16 pages.
Yifan et al.; "Geometry-Consistent Neural Shape Representation with Implicit Displacement Fields"; CVPR; arXiv:2106.05187; Feb. 2022; 20 pages.
Zhang et al.; "AvatarVerse: High-Quality & Stable 3D Avatar Creation from Text and Pose"; CVPR; arXiv:2308.03610; Aug. 2023; 10 pages.
Zhang et al.; "AvatarGen: A 3D Generative Model for Animatable Human Avatars"; CVPR; arXiv:2208.00561; Aug. 2022; 14 pages.
Zhang et al.; "Adding Conditional Control to Text-to-Image Diffusion Models"; IEEE/CVF Int'l Conf. on Computer Vision; 2023; p. 3836-3847.
Zhang et al.; "GETAvatar: Generative Textured Meshes for Animatable Human Avatars"; IEEE/CVF Int'l Conf. on Computer Vision; 2023; p. 2273-2282.

* cited by examiner

200

300

Generate a 3D human representation with a pre-defined pose in a canonical space by adopting a coarse-to-fine pipeline, wherein the 3D human representation corresponds to a 3D avatar to be created based on input text 302

Deform the 3D human representation to a target pose defined by a Skinned Multi-Person Linear (SMPL) parameter in a deformed space 304

Create the 3D avatar by implementing iterative optimization of the 3D human representation in the canonical space and the deformed space by applying a Score Distillation Sampling (SDS) loss based on the input text and information indicative of poses, wherein the poses comprise the pre-defined pose and the target pose 306

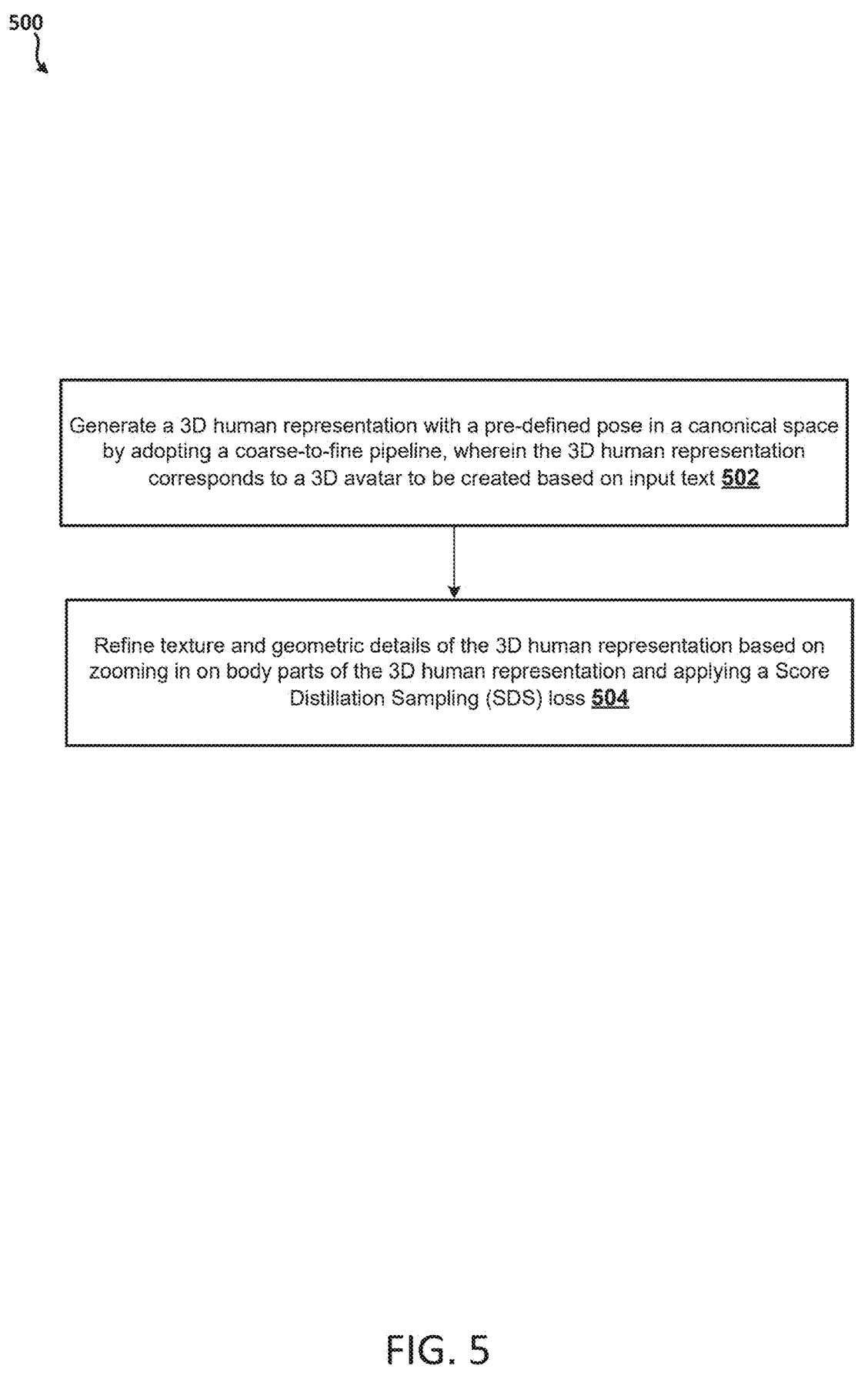

Generate a 3D human representation with a pre-defined pose in a canonical space by adopting a coarse-to-fine pipeline, wherein the 3D human representation corresponds to a 3D avatar to be created based on input text 502

Refine texture and geometric details of the 3D human representation based on zooming in on body parts of the 3D human representation and applying a Score Distillation Sampling (SDS) loss 504

FIG. 5

Generate a 3D human representation with a pre-defined pose in a canonical space by adopting a coarse-to-fine pipeline, the 3D human representation corresponding to a 3D avatar to be created 602

Render a plurality of images of the 3D human representation from a plurality of camera viewpoints, the plurality of images comprising a full-body image, a head-part image, a leg-part image, and an arm-part image 604

Render a plurality of meshes corresponding to the plurality of images from the plurality of camera viewpoints 606

Utilize the plurality of meshes as conditions for iterative optimization to ensure view-consistency and to enable accurate pose control of the created 3D avatar 608

Generate a 3D human representation with a pre-defined pose in a canonical space by adopting a coarse-to-fine pipeline, wherein the 3D human representation corresponds to a 3D avatar to be created based on input text 702

↓

Deform the 3D human representation to a target pose defined by a Skinned Multi-Person Linear (SMPL) parameter in a deformed space 704

↓

Applying different poses in the deformed space to enhance pose control generalization and accuracy of the 3D avatar 706

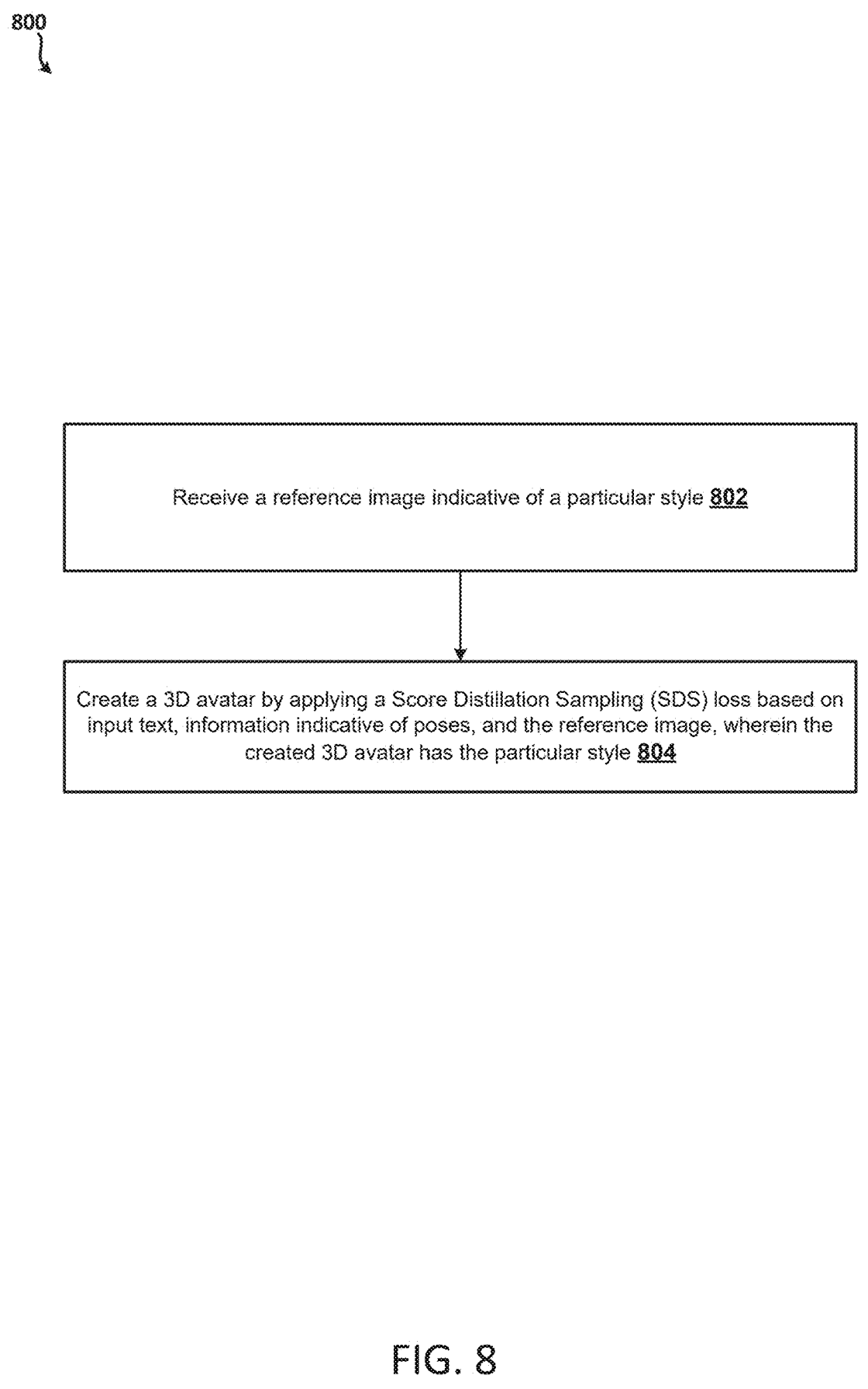

Receive a reference image indicative of a particular style 802

Create a 3D avatar by applying a Score Distillation Sampling (SDS) loss based on input text, information indicative of poses, and the reference image, wherein the created 3D avatar has the particular style 804

FIG. 8

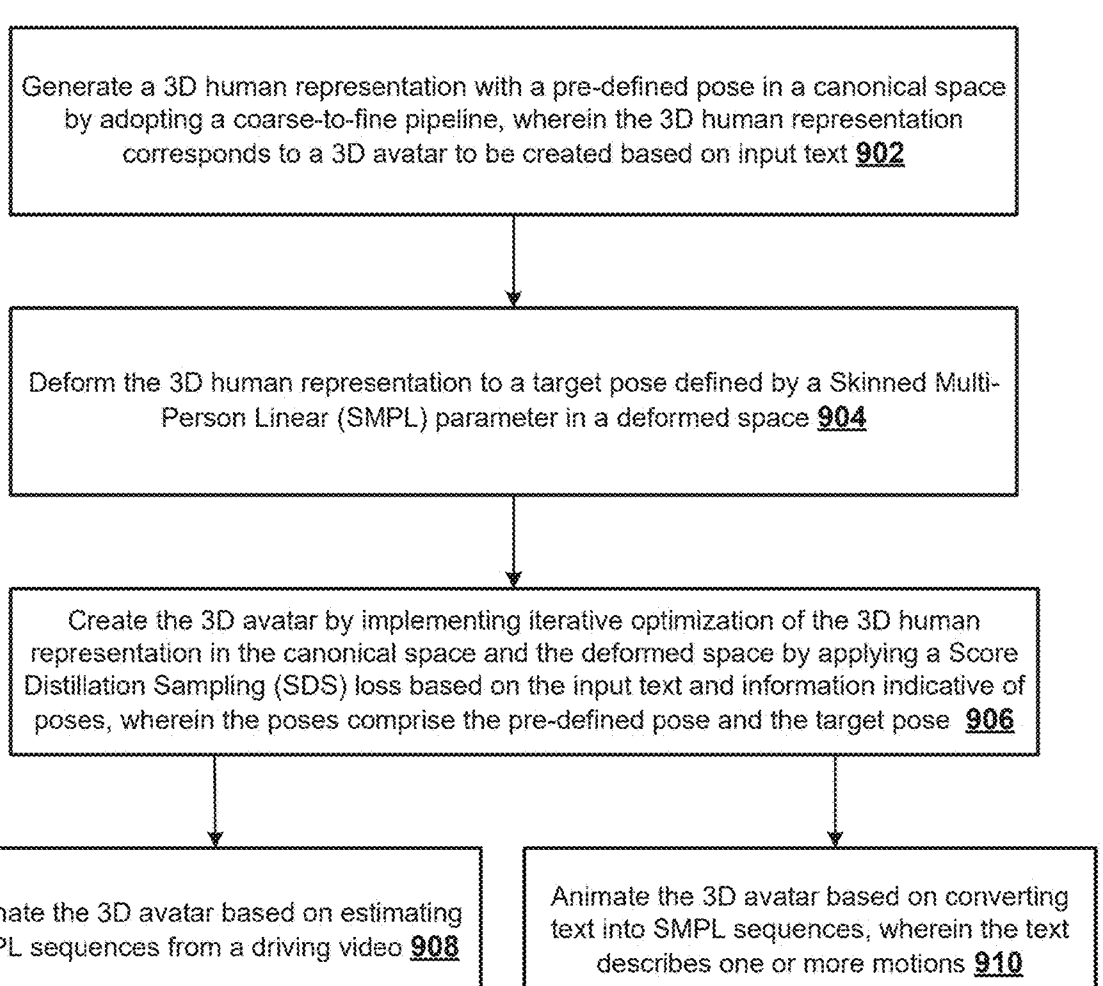
FIG. 9

1000

1300

CREATING THREE-DIMENSIONAL (3D) AVATARS

BACKGROUND

Digital content creation is increasingly being used across a variety of industries to perform a variety of different tasks, such as animation, game design, etc. Improved techniques for digital content creation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 shows an example process for creating 3D avatars in accordance with the present disclosure.

FIG. 5 shows an example process for creating 3D avatars in accordance with the present disclosure.

FIG. 6 shows an example process for creating 3D avatars in accordance with the present disclosure.

FIG. 7 shows an example process for creating 3D avatars in accordance with the present disclosure.

FIG. 8 shows an example process for creating 3D avatars in accordance with the present disclosure.

FIG. 9 shows an example process for creating 3D avatars in accordance with the present disclosure.

DETAILED DESCRIPTION OF ILLUSTRATIVE EMBODIMENTS

Figure 1:
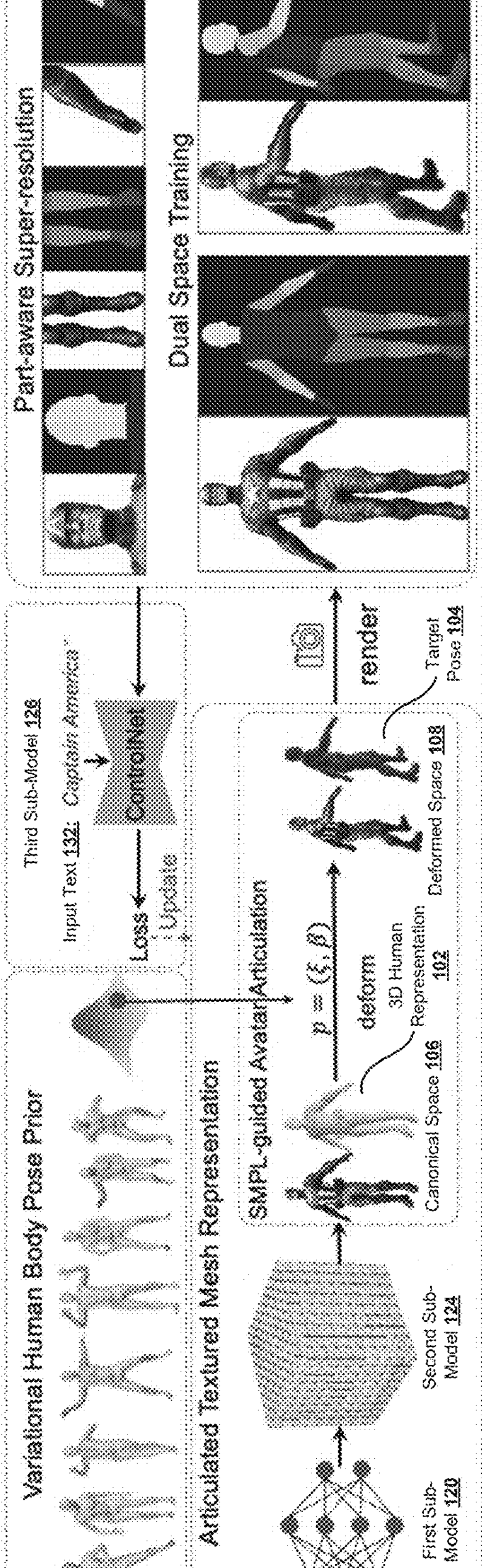
FIG. 1 shows an example system for creating high-quality and animatable three-dimensional (3D) avatars in accordance with the present disclosure.

The creation of high-fidelity and animatable three-dimensional (3D) human avatars is essential in various fields, including the media industry, virtual reality (VR), augmented reality (AR), game design, etc. However, it is a labor-intensive task that typically requires pre-captured templates and extensive work from experienced artists. Existing 3D avatars creation methods can be classified into three categories: (1) template-based generation pipeline, (2) 3D generative models, and (3) two-dimensional (2D) lifting methods. Avatars generated using template-based methods typically exhibit relatively simple topology and texture. On the other hand, 3D generative models often struggle to generalize to arbitrary avatars with diverse appearances due to the scarcity and limited diversity of accessible 3D models. Yet, in real-world applications, users often desire high-quality 3D avatars with intricate structures and artistic styles. While 2D-lifting methods have shown that 2D generation models trained on large-scale image datasets possess strong generalizability, these methods either focus primarily on creating static avatars, which makes them difficult to animate, or produce low-quality animatable 3D avatars that fail to satisfy the requirements for practical applications. As such, more advanced solutions capable of generating high-fidelity, animatable 3D avatars are needed.

Described herein is a coarse-to-fine generative model for creating high-quality and animatable 3D avatars from only textual descriptions while offering flexible animation ability. The model described herein utilizes a new 3D human representation that incorporates articulated human modeling into explicit mesh representation, enabling the animation of generated avatars with desired poses while fully harnessing the power of 2D diffusion priors at a high-resolution.

A human NeRF is trained (e.g., from scratch) with a pre-defined pose. Using this learned canonical representation as an initialization, a SMPL-guided articulated textured avatar mesh (e.g., Deep Marching Tetrahedra (DMTet)) is optimized. The mesh-based representation enables the rendering of high-resolution images through an efficient rasterization-based renderer, facilitating high-fidelity avatar creation. To improve animation quality and pose controllability, the textured avatar mesh can be jointly optimized in both the deformed and canonical spaces. To optimize the proposed articulated avatar representation from text, pre-trained 2D diffusion models can be utilized as priors. Utilizing the pre-trained 2D diffusion models can be utilized as priors offers two benefits: it ensures a more stable and view-consistent avatar creation process, and it enables more accurate pose control of the generated avatars.

Thanks to the easy-to-use animation capability of the model described herein, users can animate the generated avatars using multimodal signals (e.g., video and text). Moreover, simply plugging an additional adapter into the model enables the model to create avatars with unique artistic styles, given a reference style image, further expanding the range of applications (e.g., multimodal avatar animations and style-guided avatar creation) and customization options for 3D avatar creation.

FIG. 1 shows an example system 100. The system 100 can generate high-fidelity and animatable 3D human avatars from only text inputs. The system 100 can generate a 3D human representation 102. The 3D human representation 102 can have a pre-defined pose. The 3D human representation 102 can be generated in a canonical space 106. The 3D human representation 102 can correspond to a 3D avatar to be created based on input text 132.

The 3D human representation 102 can be generated by adopting a coarse-to-fine pipeline. The coarse-to-fine pipeline can include a coarse stage and a fine stage. Generating the 3D human representation 102 can include learning a static human representation with the pre-defined pose in the coarse stage. The static human representation with the pre-defined pose can be learned by leveraging low-resolution diffusion prior as guidance. The static human representation with the pre-defined pose can be learned by a first sub-model 120 of the system 100. The first sub-model 120 can, for example, include a NeRF. A NeRF aims to recover high-quality 3D humans from 2D observations, avoiding the need to capture ground truth 3D geometry information. Hash grid decoding with a two-layer multilayer perceptron (MLP) can be used to predict the density and color. A residual prediction scheme can be utilized on top of the Skinned Multi-Person Linear (SMPL)-derived density field, discussed in more detail below, which serves as a strong geometric prior.

A second sub-model 124 of the system 100 can be initialized with a mesh resulted from the coarse stage. The second sub-model 124 can include, for example, a Deep Marching Tetrahedra (DMTet) model. In the fine stage, the 3D human representation 102 can be modeled as a textured mesh with high-resolution diffusion prior using the second sub-model 124. In the fine stage, a differentiable surface representation (e.g., the second sub-model 124) can be used to model avatars as textured meshes. The explicit mesh representation allows for improved generation quality by optimizing with high-resolution diffusion prior (e.g., 512×512). The second sub-model 124 can represent the surface of humans with a discrete signed distance field defined on a deformable tetrahedral grid, where a mesh face will be extracted if two vertices of an edge in a tetrahedron have different signs of signed distance field (SDF) values (e.g., the orthogonal distance of a given point x to the boundary of a set Ω in a metric space). To inherit the learned geometry prior from the previous stage, the second sub-model 124 can be utilized with the mesh extracted from the coarse NeRF, such as by using a marching cube algorithm.

The system 100 can deform the 3D human representation 102 to a target pose 104. Skinned Multi-Person Linear (SMPL)-guided articulation can be used to drive the generated avatar to the desired poses. SMPL is a parametric human model that represents a wide range of human body poses and shapes. It defines a deformable mesh M(ξ, B)=(V, S), where ξ and β denote the pose and shape parameters, V is the set of $N_v$=6890 vertices, and S is the set of linear blend skinning (LBS) weights assigned for each vertex. SMPL provides an articulated geometric proxy to the underlying dynamic human body.

In embodiments, the target pose 104 can be defined by a SMPL parameter. Specifically, given SMPL parameter p=(ξ, β), the system 100 can generate a template avatar with a pre-defined pose in the canonical space 106. The system 100 can deform the template avatar with the pre-defined pose in the canonical space 106 to the target pose defined by the corresponding parameter p in the deformed space 108. The inverse transformation of SMPL LBS can be leveraged to guide the deformation of the 3D human representation 102. Specifically, given a point $x_d$ in the deformed space 108, its nearest vertex v*in the corresponding SMPL mesh can be identified, and then the skinning weights of v* can be used to deform xa to the corresponding point $x_c$ in the canonical space 106:

$$x_c = G^{-1} \cdot x_d, \quad G = \sum_{i=1}^{N_j} s_i^* \cdot B_i(\xi, \beta)$$

where $$s_i^*$$

is the skinning weight of vertex v* with respect to the i-th joint, ξ, β) is the bone transformation matrix of joint i, and $N_j$=24 is the number of joints.

For articulating avatar modeling, the correspondence between the canonical space 106 and the deformed space 108 can be articulated via the SMPL-guided deformation. For example, for a point $x_d$ in the deformed space 108, the corresponding point $x_c$ in the canonical space 106 can be determined using the equation above. Then, signed distance offset from the surface of the mesh extracted from the coarse model can be predicted for geometry refinement. The final signed distance of the fine stage $d_{fine}(x_c)$ at point $x_d$ can be computed as:

$$d_{fine}(x_c) = d_{coarse}(x_c) + \Delta d(x_c)$$

where $d_{coarse}(x_c)$ is the signed distance value from the coarse stage, and $\Delta d(x_c)$ is the residual SDF value predicted by a two-layer MLP. This enables the animation of the generated avatars to arbitrary poses by simply deforming the canonical one. The neural color field initialized from the coarse stage can be employed for mesh textures modeling under a higher-resolution space.

The system 100 can create the 3D avatar by implementing iterative optimization of the 3D human representation 102 in the canonical space 106 and the deformed space 108. The iterative optimization can be implemented by applying a Score Distillation Sampling (SDS) loss based on the input text 132 and information indicative of poses. The poses can include the pre-defined pose and the target pose 104.

In embodiments, 2D diffusion models can be employed as priors for guiding the 3D human generation process. The core idea is to optimize the 3D human generation process can by distilling prior knowledge from a pretrained diffusion model using SDS loss. Although the image diffusion model can guide content generation, it can struggle to synthesize a human avatar with the correct pose due to the absence of conditioning signals. To address this, a DensePose-conditioned ControlNet that leverages a more expressive DensePose signal as a condition for avatar generation. Given the SMPL parameter p, the human image I=g(θ, p) can be rendered from the 3D human model g parametrized by θ. The SMPL mesh defined by p as DensePose conditions $I_{cond}$ can be rendered from the same camera viewpoint as I. The DensePose-conditioned SDS loss can be defined as follows:

$$\nabla_\theta L_{SDS}(\phi, 1 = g(\theta, p)) = E_{t,\epsilon}\left[\omega(t)(\hat{\epsilon}_\phi(I_t; y, I_{cond}, t) - \epsilon)\frac{\partial I}{\partial \eta}\right],$$

where p=(ξ, β) is the SMPL parameter, $I_t$ denotes the noisy image at noise level t, ω(t) is a weighting function that depends on the noise level t, ∈ is the added noise, and y is the input text prompt 132. Compared to a skeleton-conditioned ControlNet, DensePose-conditioned ControlNet offers two benefits: 3D-aware DensePose ensures a more stable and view-consistent avatar creation process, and it enables more accurate pose control of the generated avatars.

In embodiments, directly generating the full-body avatars can produce results that are blurry and lack fine details. To improve the fidelity of the generated avatars, a part-aware super-resolution strategy can be adopted for both the coarse and fine stages. By leveraging the body prior from SMPL, the positions of different body parts (e.g., head, hand, upper body, lower body, and arm) can be determined. Each part can be zoomed in on, and SDS can be applied to refine their texture and geometric details. To guide this fine-grained optimization, the corresponding text prompts for each body part (e.g., "The headshot of <name>", "The right hand of <name>", etc.) can be used, where <name> is the textual description of an avatar.

In embodiments, to improve the quality of animation while maintaining high-quality textures and geometries, a dual-space training strategy that jointly optimizes the human avatar in both the canonical space and deformed space can be adopted. An "A-pose" can be utilized in the canonical space, as it is a common pose for natural humans. Within the deformed space, different poses can be sampled for training to enhance pose control generalization and accuracy. In particular, human poses from a variational autoencoder that learns a latent representation of the human pose prior can be randomly sampled during the training process. In embodiments, to ensure better alignment with input text, a large classifier free guidance (CFG) scale can be used when optimizing avatar representation with SDS. The CFG scale can control how closely stable diffusion should follow the input text prompt 132. To alleviate color saturation, which can make the generated avatars look unreal, a CFG rescale trick, which can adjust the conditioning and un-conditioning scales of a model's output based on a specified multiplier, can be applied for adjusting the denoised $\hat{x}_0$.

Figure 2:
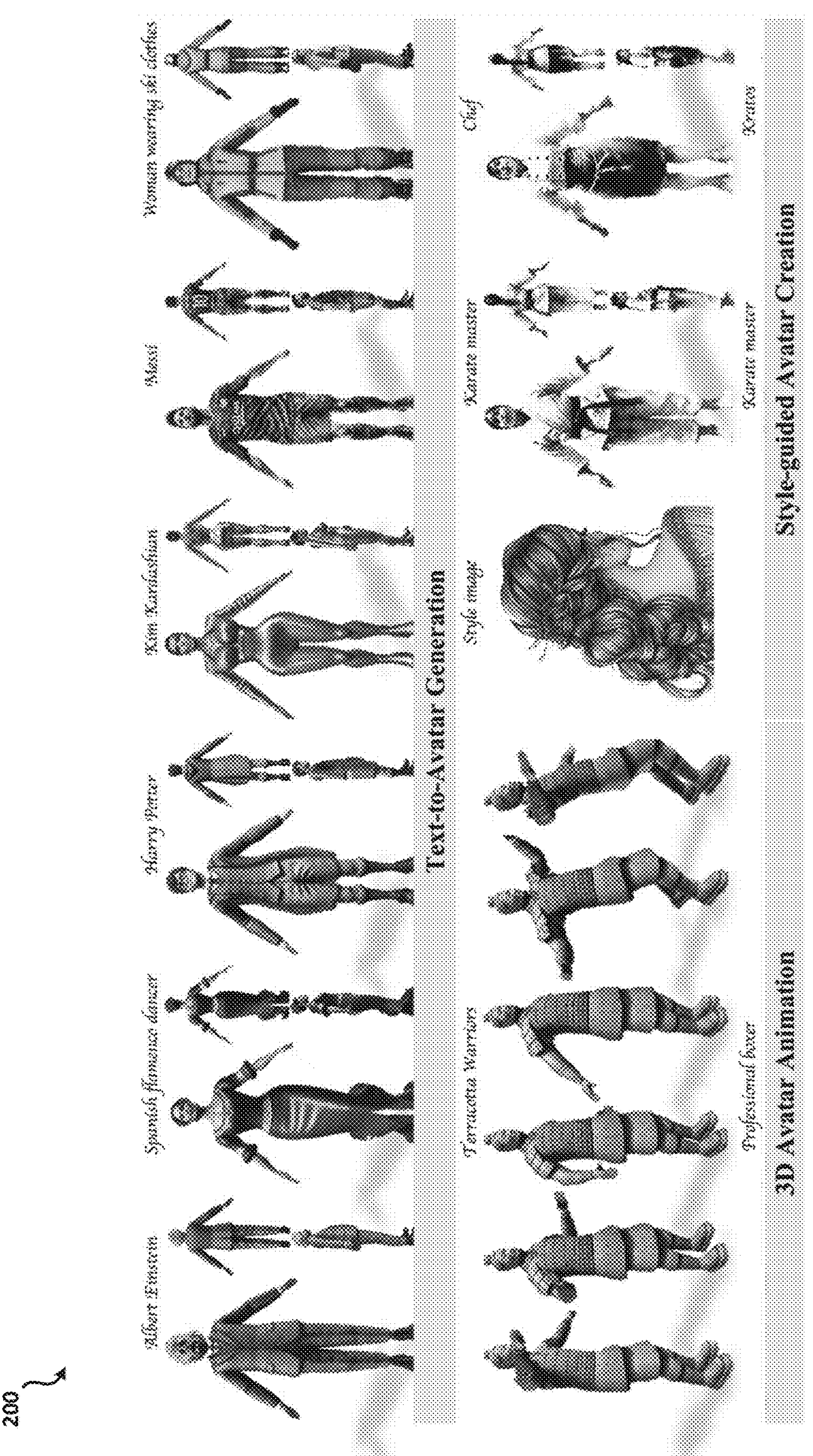
FIG. 2 shows example 3D avatars created in accordance with the present disclosure.

FIG. 2 shows an example set 200 of high-quality and animatable 3D avatars created in accordance with the present disclosure. As shown in FIG. 2, with only text inputs, the system 100 can generate high-fidelity, animatable 3D avatars featuring realistic textures and detailed geometry, including high-resolution faces and varied clothing styles. A unique feature of the system 100 is its easy-to-use animation capability, which allows users to animate the generated avatars via multimodal signals, such as a dancing video or a motion described by text (e.g., "A person is doing boxing"). Furthermore, the system 100 supports the creation of avatars with distinct artistic styles (e.g., sketch style) given an additional reference style image.

FIG. 3 shows an example process 300 for creating high-quality and animatable 3D avatars. Although depicted as a sequence of operations in FIG. 3, those of ordinary skill in the art will appreciate that various embodiments may add, remove, reorder, or modify the depicted operations.

At 302, a 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline.

At 304, the 3D human representation can be deformed. The 3D human representation can be deformed to a target pose (e.g., target pose 104). The target pose can be defined by a Skinned Multi-Person Linear (SMPL) parameter in a deformed space. For example, SMPL can define a deformable mesh $M(\xi, \beta)=(V, S)$, where $\xi$ and $\beta$ denote the pose and shape parameters, V is the set of $N_v=6890$ vertices, and S is the set of linear blend skinning (LBS) weights assigned for each vertex. SMPL provides an articulated geometric proxy to the underlying dynamic human body.

At 306, the 3D avatar can be created. The 3D avatar can be created by implementing iterative optimization of the 3D human representation in the canonical space and the deformed space. The 3D avatar can be created by applying a Score Distillation Sampling (SDS) loss based on the input text and information indicative of poses. The poses can include the pre-defined pose and the target pose. In embodiments, 2D diffusion models can be employed as priors for guiding the 3D human generation process.

Figure 4:
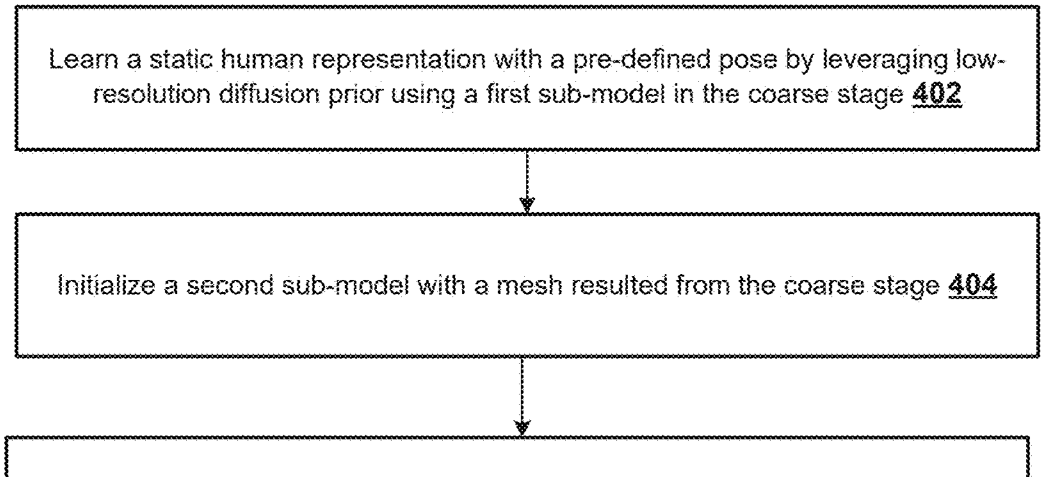
FIG. 4 shows an example process for creating 3D avatars in accordance with the present disclosure.

FIG. 4 shows an example process 400 for creating high-quality and animatable 3D avatars. Although depicted as a sequence of operations in FIG. 4, those of ordinary skill in the art will appreciate that various embodiments may add, remove, reorder, or modify the depicted operations.

A 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline. The coarse-to-fine pipeline can include a coarse stage and a fine stage.

At 402, a static human representation with the pre-defined pose can be learned. The static human representation with the pre-defined pose can be learned in the coarse stage. The static human representation with the pre-defined pose can be learned by leveraging low-resolution diffusion prior as guidance. The static human representation with the pre-defined pose can be learned using a first sub-model (e.g., first sub-model 120). The first sub-model 120 can, for example, include a human NeRF. A human NeRF aims to recover high-quality 3D humans from 2D observations, avoiding the need to capture ground truth 3D geometry information. Hash grid decoding with a two-layer multilayer perceptron (MLP) can be used to predict the density and color. At 404, a second sub-model (e.g., second sub-model 124) can be initialized. The second sub-model can be initialized with a mesh resulted from the coarse stage. The second sub-model can include a Deep Marching Tetrahedra (DMTet) model.

At 406, the 3D human representation can be modeled as a textured mesh with high-resolution diffusion prior. The 3D human representation can be modeled as a textured mesh with high-resolution diffusion prior using the second sub-model. The 3D human representation can be modeled as a textured mesh with high-resolution diffusion prior in the fine stage. For example, in the fine stage, a differentiable surface representation can be used to model avatars as textured meshes. The explicit mesh representation allows for improved generation quality by optimizing with high-resolution diffusion prior (e.g., 512×512). The second sub-model can represent the surface of humans with a discrete signed distance field defined on a deformable tetrahedral grid, where a mesh face will be extracted if two vertices of an edge in a tetrahedron have different signs of signed distance field (SDF) values (e.g., the orthogonal distance of a given point x to the boundary of a set $\Omega$ in a metric space). To inherit the learned geometry prior from the previous stage, the second sub-model can be utilized with the mesh extracted from the coarse NeRF, such as by using a marching cube algorithm.

FIG. 5 shows an example process 500 for creating high-quality and animatable 3D avatars. Although depicted as a sequence of operations in FIG. 5, those of ordinary skill in the art will appreciate that various embodiments may add, remove, reorder, or modify the depicted operations.

At 502, a 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline. The 3D human representation can be optimized by distilling prior knowledge from a pretrained diffusion model using SDS loss. At 504, texture and geometric details of the 3D human representation can be refined. The texture and geometric details of the 3D human representation can be refined based on zooming in on body parts of the 3D human representation. The texture and geometric details of the 3D human representation can be refined based on applying the SDS loss.

FIG. 6 shows an example process 600 for creating high-quality and animatable 3D avatars. Although depicted as a sequence of operations in FIG. 6, those of ordinary skill in the art will appreciate that various embodiments may add, remove, reorder, or modify the depicted operations.

At 602, a 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline.

At 604, a plurality of images of the 3D human representation can be rendered. The plurality of images can be rendered from a plurality of camera viewpoints. The plurality of images can include a full-body image, a head-part image, a leg-part image, and an arm-part image. At 606, a plurality of meshes can be rendered. The plurality of meshes can correspond to the plurality of images. The plurality of meshes can be rendered from the plurality of camera viewpoints. At 608, the plurality of meshes can be utilized. The plurality of meshes can be utilized as conditions for iterative optimization to ensure view-consistency and to enable accurate pose control of the created 3D avatar.

FIG. 7 shows an example process 700 for creating high-quality and animatable 3D avatars. Although depicted as a sequence of operations in FIG. 7, those of ordinary skill in the art will appreciate that various embodiments may add, remove, reorder, or modify the depicted operations.

At 702, a 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline.

At 704, the 3D human representation can be deformed. The 3D human representation can be deformed to a target pose (e.g., target pose 104). The target pose can be defined by a Skinned Multi-Person Linear (SMPL) parameter in a deformed space. For example, SMPL can define a deformable mesh $M(\xi, \beta)=(V, S)$, where $\xi$ and $\beta$ denote the pose and shape parameters, V is the set of $N_v=6890$ vertices, and S is the set of linear blend skinning (LBS) weights assigned for each vertex. SMPL provides an articulated geometric proxy to the underlying dynamic human body. At 706, different poses can be applied in the deformed space. Applying the different poses in the deformed space can enhance pose control generalization and accuracy of the 3D avatar.

FIG. 8 shows an example process 800 for creating high-quality and animatable 3D avatars. Although depicted as a sequence of operations in FIG. 8, those of ordinary skill in the art will appreciate that various embodiments may add, remove, reorder, or modify the depicted operations.

A 3D human representation (e.g., 3D human representation 102) can be generated by a model. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be deformed by the model. The 3D human representation can be deformed to a target pose (e.g., target pose 104). The target pose can be defined by a Skinned Multi-Person Linear (SMPL) parameter in a deformed space. Simply plugging an additional adapter into the model enables the model to create avatars with unique artistic styles, given a reference style image, further expanding the range of applications (e.g., multimodal avatar animations and style-guided avatar creation) and customization options for 3D avatar creation. At 802, a reference image can be received. The reference image can be indicative of a particular style. At 804, a 3D avatar can be created. The 3D avatar can be created by implementing iterative optimization of the 3D human representation in the canonical space and the deformed space. The 3D avatar can be created by applying a Score Distillation Sampling (SDS) loss based on input text, information indicative of poses, and the reference image. The created 3D avatar can have the particular style.

FIG. 9 shows an example process 900 for creating high-quality and animatable 3D avatars. Although depicted as a sequence of operations in FIG. 9, those of ordinary skill in the art will appreciate that various embodiments may add, remove, reorder, or modify the depicted operations.

At 902, a 3D human representation (e.g., 3D human representation 102) can be generated. The 3D human representation can have a pre-defined pose. The 3D human representation can be generated in a canonical space (e.g., canonical space 106). The 3D human representation can correspond to a 3D avatar to be created based on input text (e.g., input text 132). The 3D human representation can be generated by adopting a coarse-to-fine pipeline.

At 904, the 3D human representation can be deformed. The 3D human representation can be deformed to a target pose (e.g., target pose 104). The target pose can be defined by a Skinned Multi-Person Linear (SMPL) parameter in a deformed space. For example, SMPL can define a deformable mesh $M(\xi, \beta)=(V, S)$, where $\xi$ and $\beta$ denote the pose and shape parameters, V is the set of $N_v=6890$ vertices, and S is the set of linear blend skinning (LBS) weights assigned for each vertex. SMPL provides an articulated geometric proxy to the underlying dynamic human body.

At 906, the 3D avatar can be created. The 3D avatar can be created by implementing iterative optimization of the 3D human representation in the canonical space and the deformed space. The 3D avatar can be created by applying a Score Distillation Sampling (SDS) loss based on the input text and information indicative of poses. The poses can include the pre-defined pose and the target pose. In embodiments, 2D diffusion models can be employed as priors for guiding the 3D human generation process.

A user can drive the 3D avatar using multimodal signals (e.g., video, text, audio, etc). For video-driven animation, SMPL sequences can be estimated from a driving video. The SMPL sequences can then be leveraged to animate the generated 3D avatar. At 908, the 3D avatar can be animated based on estimating SMPL sequences from a driving video. For text-driven animation, text can be converted into SMPL sequences. The text can describe one or more desired motions. At 910, the 3D avatar can be animated based on converting the text into SMPL sequences. Benefiting from the articulation modeling integrated into the explicit mesh representation described herein, the generated 3D avatar can be easily animated, exhibiting natural movements.

Figure 10:
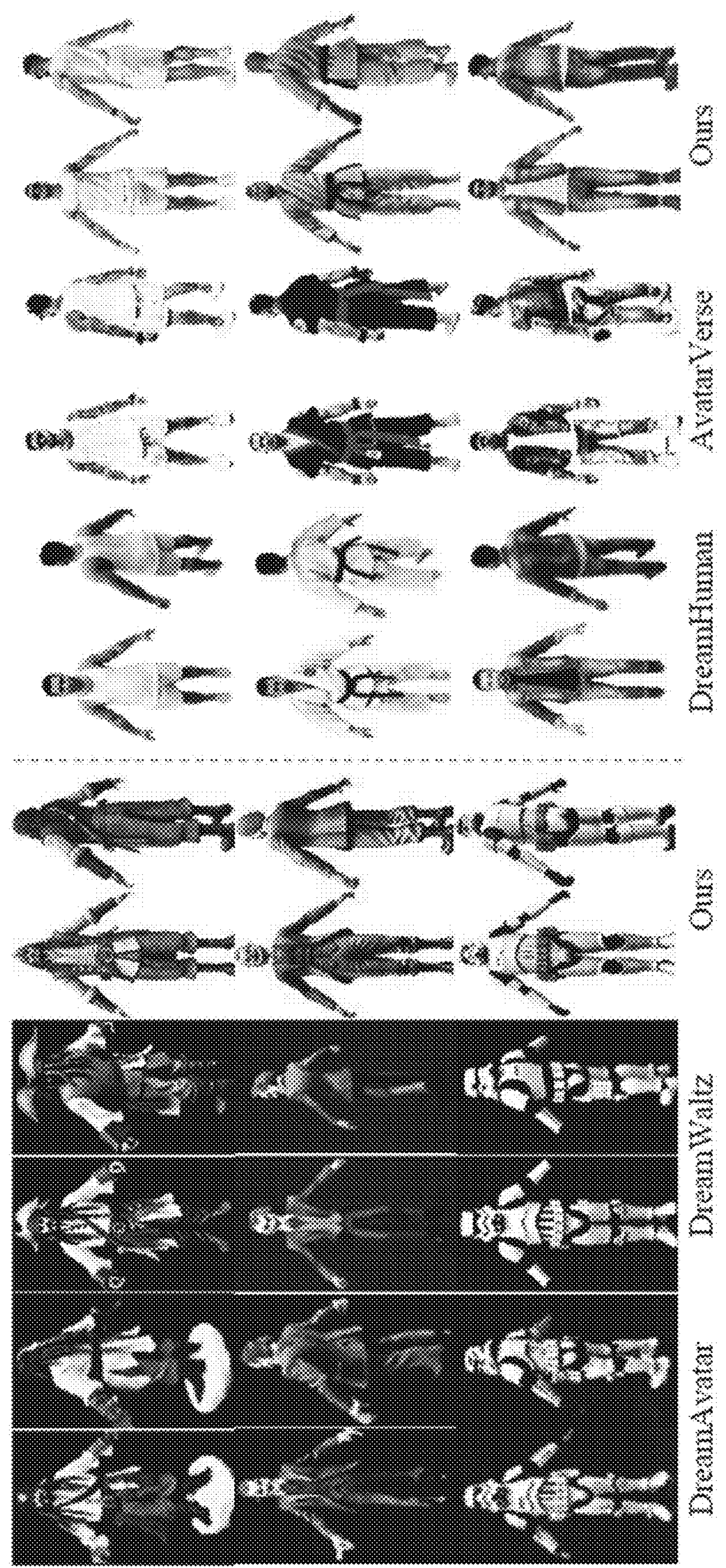
FIG. 10 shows an example comparison of 3D avatars in accordance with the present disclosure.
Figure 11:
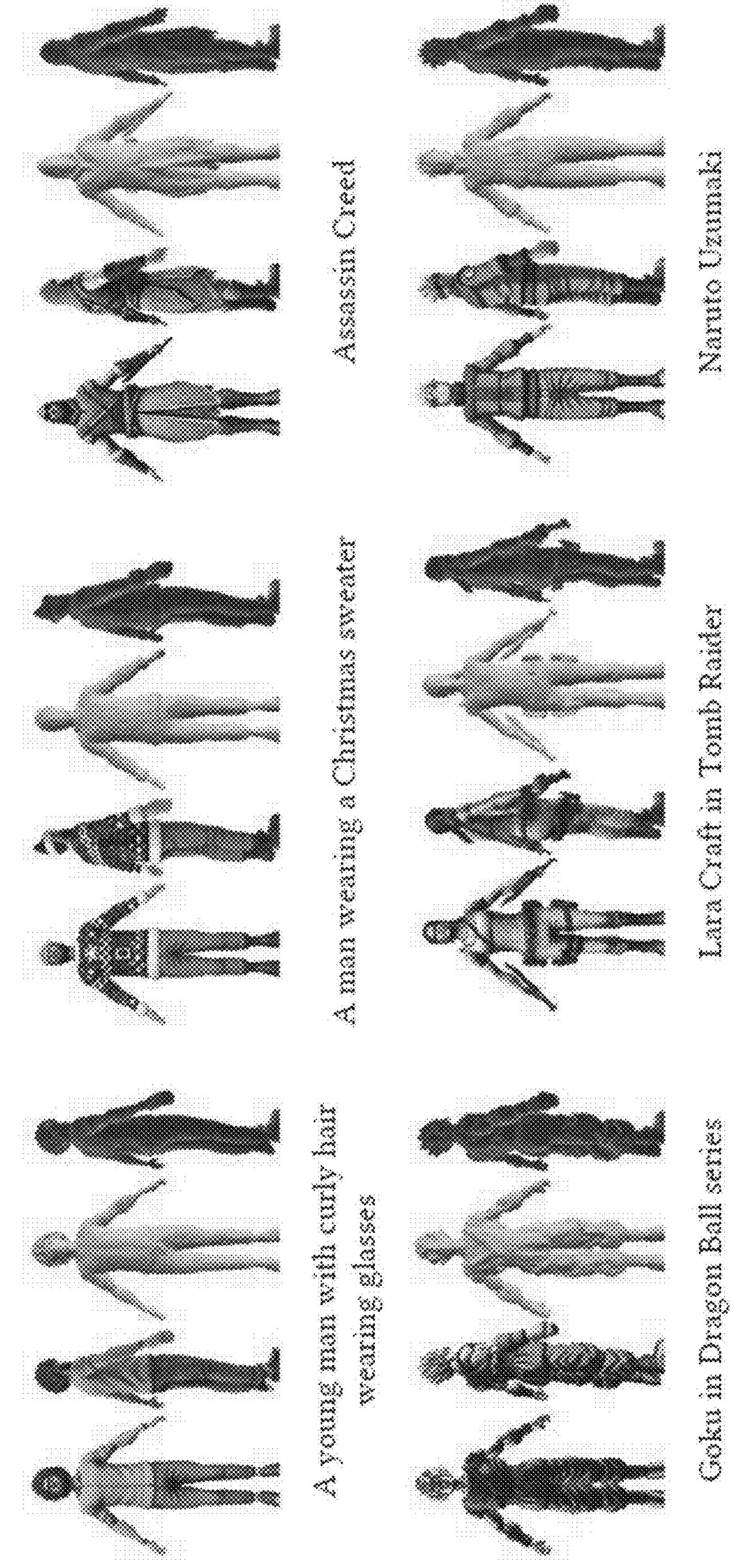
FIG. 11 shows example 3D avatars created in accordance with the present disclosure.

Experiments were conducted to evaluate the performance of the system 100. FIG. 10 shows a qualitative comparison 1000 of 3D avatars created using the system 100 3D avatars created using alternative 3D avatar creation methods. These alternative methods, like the system 100, employ human priors and 2D diffusion models for the creation of 3D avatars. Benefiting from the explicit mesh representation, the system 100 outperforms some the other methods significantly in terms of both geometry and texture, resulting in richer details across all cases. The system 100 can generate avatars with clearer appearances (1st and 3rd rows) and align more closely with the input texts (2nd row). Moreover, thanks to its articulation modeling, a standout feature of the system 100 is its ability to support avatar animation (discussed in more detail with relation to FIG. 13). The qualitative comparison 1000 clearly demonstrates the superiority of the system 100 for text-guided 3D avatar creation. The normal maps 1100 of the generated avatars are shown in FIG. 11, and show that the system 100 produces high-quality and detailed geometry.

CLIP Score was used as an evaluation metric to measure the consistency between the generated avatars and input texts for the above methods. For each method, its generated avatars were rendered from four evenly distributed horizontal views, and the averaged CLIP score was calculated for these rendered images and the input text. The avatars generated using the system 100 were compared to avatars generated using alternative methods, in term of specific characters generation and realistic human generation. The CLIP scores for the system 100 was higher than that for the alternative methods, showing that the system 100 consistently outperforms all these methods, verifying its effectiveness in creating more accurate avatars in alignment with the input texts.

Figures 12A, 12B, 12C, 12D, 12E:
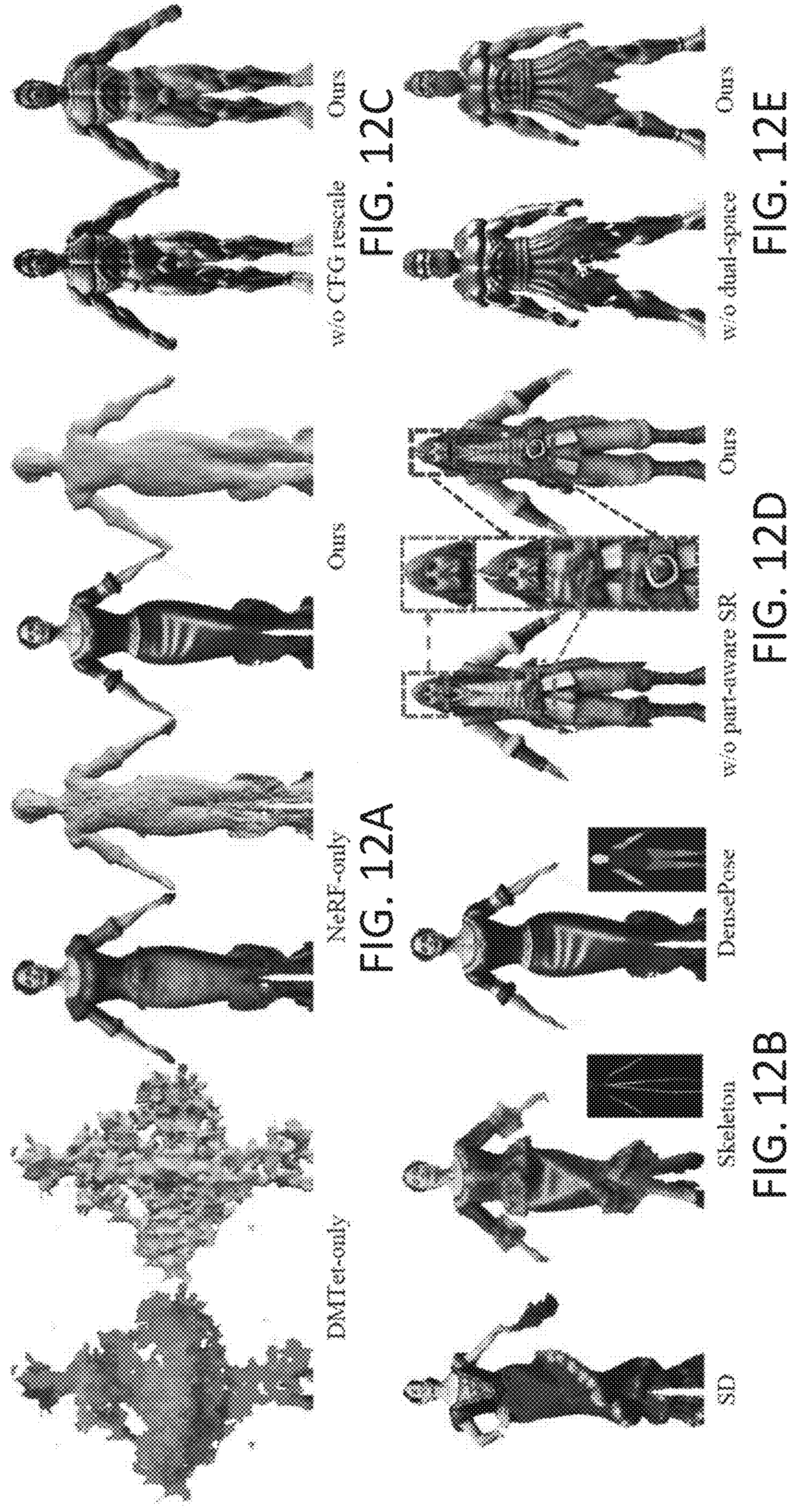
FIGS. 12A-12E show example qualitative results of ablation studies.

As described above, the system 100 utilizes an articulated mesh representation in a coarse-to-fine manner, with the coarse stage being represented by NeRF. To explore the impact of different 3D representations, 3D avatars were optimized from text using either mesh-only (DMTet) or NeRF-only representations. As shown in FIG. 12*a*, directly optimizing meshes for avatar creation results in collapsed results, while using NeRF-only representation often yields avatars of lower quality. In contrast, the articulated representation used by the system 100, which combines NeRF and mesh, successfully generates high-resolution images with fine details, demonstrating its effectiveness.

As described above, the system 100 utilizes ControlNet conditioned on DensePose for SDS guidance. To assess its efficacy, the performance of the system 100 when trained with StableDiffusion (SD) or Skeleton-conditioned ControlNet is evaluated (see FIG. 12*b*). As shown in FIG. 12*b*, the system 100 guided by StableDiffusion generates avatars that exhibit incorrect poses and lower quality due to the lack of pose-aware guidance, which results in inaccurate animations. While the Skeletonconditioned ControlNet model improves pose control, it still suffers from inaccuracies in foot positioning and head orientation. In contrast, DensePose-conditioned diffusion guidance achieves precise and stable pose control, accompanied by high-quality textures, which validates the importance of leveraging DensePose-conditioned guidance in the avatar creation process.

Further, the individual impacts of part-aware super-resolution (SR) and CFG rescale strategy were evaluated. As shown in FIG. 12*c*, the CFG rescale method can mitigate the color saturation issue, generating more natural appearance for the generated avatar. Upon the addition of part-aware super-resolution, the model can produce sharper appearances and more local fine details, such as on faces and belts (see FIG. 12*d*). These studies validate the effectiveness of each proposed component in our approach, demonstrating their substantial contribution to the final result.

To validate the effectiveness of the dual-space training described herein, the system 100 was compared with a baseline that trains on canonical space only. The generated RGB images are visualized for qualitative comparison in FIG. 12*c*. As shown in FIG. 12*c*, without dual-space training, the generated avatar exhibits poor details when deformed to a different pose, suggesting that dual-space training is essential to improve the robustness against different poses.

Figure 13:
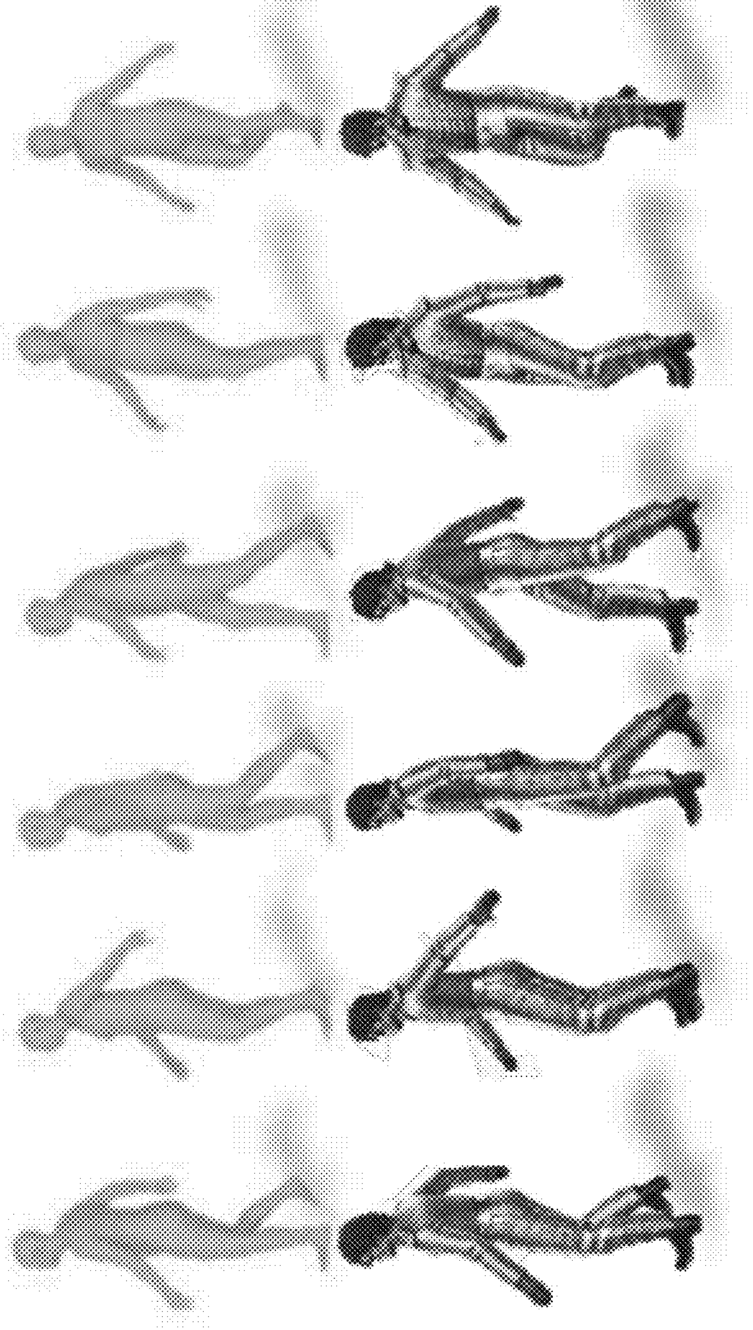
FIG. 13 shows example animated 3D avatars.

A crucial feature of the system 100 lies in its capability to provide high quality, natural and easy-to-use animation, which allows users to drive avatars using multimodal signals (e.g., video, text, audio, etc.) FIG. 13 shows the animation 1300 of avatars created by the system 100 using text. For text-driven animation, text is converted into SMPL sequences. Benefiting from the articulation modeling integrated into the explicit mesh representation, the generated avatars can be easily animated, exhibiting natural movements. The consistency of these results with respect to SMPL motions ensures that the avatars generated by the system 100 leverage any multimodal-to-motion methods that output SMPL sequences for animation. These examples showcase the versatility and potential of our method in creating realistically animated avatars from diverse text prompts.

Further, the system 100 supports stylized avatar creation by simply providing an additional style image. To achieve this, IP-Adapter, an adapter that enables image prompt capability for pre-trained text-to-image diffusion model via a decoupled cross-attention design, can be employed. IP-Adapter is plugged into the DensePose-conditioned ControlNet of the system 100 and is optimized with SDS. Without bells and whistles, the system 100 can generate high-quality avatars of various styles of interests. The provided style image can be combined with a text prompt to enable flexible avatar creation. This capability expands the application of the system 100, allowing users to create stylized avatars catering to specific aesthetic desires.

Figure 14:
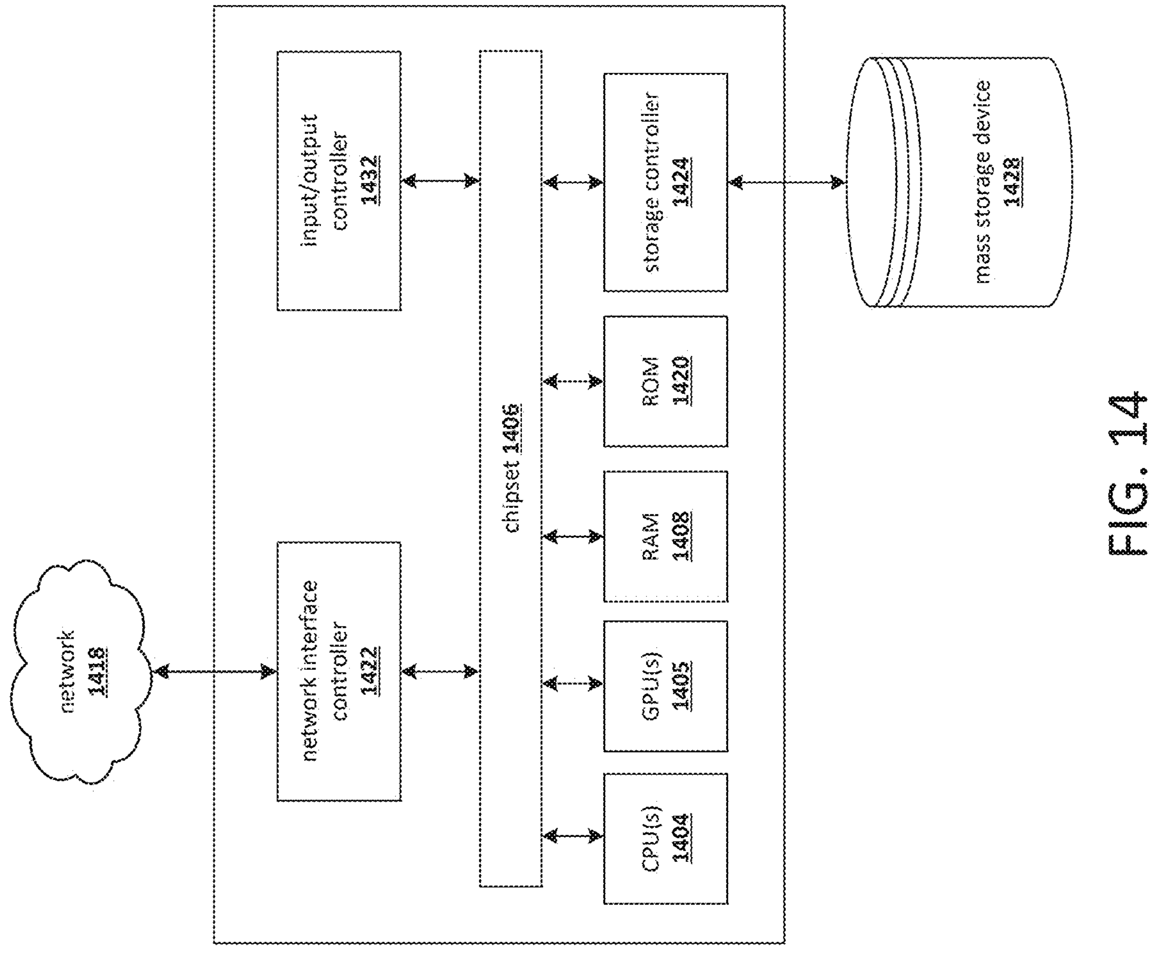
FIG. 14 shows an example computing device which may be used to perform any of the techniques disclosed herein.

FIG. 14 illustrates a computing device that may be used in various aspects, such as the services, networks, modules, and/or devices depicted in any of FIG. 1. With regard to FIG. 1, any or all of the components may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of creating three-dimensional (3D) avatars, comprising:

generating a 3D human representation with a pre-defined pose in a canonical space by adopting a coarse-to-fine pipeline, wherein the 3D human representation corresponds to a 3D avatar to be created based on input text;

deforming the 3D human representation to a target pose defined by a Skinned Multi-Person Linear (SMPL) parameter in a deformed space; and creating the 3D avatar by implementing iterative optimization of the 3D human representation in the canonical space and the deformed space by applying a Score Distillation Sampling (SDS) loss based on the input text and information indicative of poses, wherein the poses comprise the pre-defined pose and the target pose.

2. The method of claim 1, wherein the coarse-to-fine pipeline comprises a coarse stage and a fine stage, and wherein the generating a 3D human representation comprises:

learning a static human representation with the pre-defined pose by leveraging low-resolution diffusion prior using a first sub-model in the coarse stage;

initializing a second sub-model with a mesh resulted from the coarse stage; and modeling the 3D human representation as a textured mesh with high-resolution diffusion prior by using the second sub-model in the fine stage.

3. The method of claim 1, further comprising:

refining texture and geometric details of the 3D human representation based on zooming in on body parts of the 3D human representation and applying the SDS loss.

4. The method of claim 1, further comprising:

rendering a plurality of images of the 3D human representation from a plurality of camera viewpoints.

5. The method of claim 4, wherein the plurality of images comprising a full-body image, a head-part image, a leg-part image, and an arm-part image.

6. The method of claim 4, further comprising:

rendering a plurality of meshes corresponding to the plurality of images from the plurality of camera viewpoints; and utilizing the plurality of meshes as conditions for the iterative optimization to ensure view-consistency and to enable accurate pose control of the created 3D avatar.

7. The method of claim 1, further comprising:

enhancing pose control generalization and accuracy by applying different poses in the deformed space.

8. The method of claim 1, further comprising:

receiving a reference image indicative of a particular style; and creating the 3D avatar by applying the SDS loss based on the input text, the information indicative of the poses, and the reference image, wherein the created 3D avatar has the particular style.

9. The method of claim 1, further comprising:

animating the 3D avatar based on estimating SMPL sequences from a driving video; or animating the 3D avatar based on converting text into SMPL sequences, wherein the text describes one or more motions.

10. A system of creating three-dimensional (3D) avatars, comprising:

at least one processor; and at least one memory communicatively coupled to the at least one processor and comprising computer-readable instructions that upon execution by the at least one processor cause the at least one processor to perform operations comprising:

generating a 3D human representation with a pre-defined pose in a canonical space by adopting a coarse-to-fine pipeline, wherein the 3D human representation corresponds to a 3D avatar to be created based on input text;

deforming the 3D human representation to a target pose defined by a Skinned Multi-Person Linear (SMPL) parameter in a deformed space; and creating the 3D avatar by implementing iterative optimization of the 3D human representation in the canonical space and the deformed space by applying a Score Distillation Sampling (SDS) loss based on the input text and information indicative of poses, wherein the poses comprise the pre-defined pose and the target pose.

11. The system of claim 10, wherein the coarse-to-fine pipeline comprises a coarse stage and a fine stage, and wherein the generating a 3D human representation comprises:

learning a static human representation with the pre-defined pose by leveraging low-resolution diffusion prior using a first sub-model in the coarse stage;

initializing a second sub-model with a mesh resulted from the coarse stage; and modeling the 3D human representation as a textured mesh with high-resolution diffusion prior by using the second sub-model in the fine stage.

12. The system of claim 10, the operations further comprising:

refining texture and geometric details of the 3D human representation based on zooming in on body parts of the 3D human representation and applying the SDS loss.

13. The system of claim 10, the operations further comprising:

rendering a plurality of images of the 3D human representation from a plurality of camera viewpoints.

14. The system of claim 13, the operations further comprising:

rendering a plurality of meshes corresponding to the plurality of images from the plurality of camera viewpoints; and utilizing the plurality of meshes as conditions for the iterative optimization to ensure view-consistency and to enable accurate pose control of the created 3D avatar.

15. The system of claim 10, the operations further comprising:

receiving a reference image indicative of a particular style; and creating the 3D avatar by applying the SDS loss based on the input text, the information indicative of the poses, and the reference image, wherein the created 3D avatar has the particular style.

16. A non-transitory computer-readable storage medium, storing computer-readable instructions that upon execution by a processor cause the processor to implement operations comprising:

generating a 3D human representation with a pre-defined pose in a canonical space by adopting a coarse-to-fine pipeline, wherein the 3D human representation corresponds to a 3D avatar to be created based on input text;

deforming the 3D human representation to a target pose defined by a Skinned Multi-Person Linear (SMPL) parameter in a deformed space; and creating the 3D avatar by implementing iterative optimization of the 3D human representation in the canonical space and the deformed space by applying a Score Distillation Sampling (SDS) loss based on the input text and information indicative of poses, wherein the poses comprise the pre-defined pose and the target pose.

17. The non-transitory computer-readable storage medium of claim 16, wherein the coarse-to-fine pipeline comprises a coarse stage and a fine stage, and wherein the generating a 3D human representation comprises:

learning a static human representation with the pre-defined pose by leveraging low-resolution diffusion prior using a first sub-model in the coarse stage;

initializing a second sub-model with a mesh resulted from the coarse stage; and modeling the 3D human representation as a textured mesh with high-resolution diffusion prior by using the second sub-model in the fine stage.

18. The non-transitory computer-readable storage medium of claim 16, the operations further comprising:

refining texture and geometric details of the 3D human representation based on zooming in on body parts of the 3D human representation and applying the SDS loss.

19. The non-transitory computer-readable storage medium of claim 16, the operations further comprising:

rendering a plurality of images of the 3D human representation from a plurality of camera viewpoints.

20. The non-transitory computer-readable storage medium of claim 19, the operations further comprising:

rendering a plurality of meshes corresponding to the plurality of images from the plurality of camera viewpoints; and utilizing the plurality of meshes as conditions for the iterative optimization to ensure view-consistency and to enable accurate pose control of the created 3D avatar.

* * * * *